(12) United States Patent
McCully et al.

(10) Patent No.: US 11,667,458 B2
(45) Date of Patent: *Jun. 6, 2023

(54) SHIPPING CONTAINERS FOR BATTERIES

(71) Applicant: The Boeing Company, Chicago, IL (US)

(72) Inventors: Roger McCully, Laveen, AZ (US); Jay Sumner, Canyon Country, CA (US)

(73) Assignee: THE BOEING COMPANY, Arlington, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/484,872

(22) Filed: Sep. 24, 2021

(65) Prior Publication Data

US 2022/0009695 A1 Jan. 13, 2022

Related U.S. Application Data

(63) Continuation of application No. 16/740,047, filed on Jan. 10, 2020, now Pat. No. 11,167,909.

(51) Int. Cl.
*B65D 81/26* (2006.01)
*B65D 85/84* (2006.01)
*B65D 81/05* (2006.01)
*B65D 85/30* (2006.01)

(52) U.S. Cl.
CPC ......... *B65D 81/264* (2013.01); *B65D 81/051* (2013.01); *B65D 85/30* (2013.01); *B65D 85/84* (2013.01); *B65D 2581/052* (2013.01); *B65D 2585/88* (2013.01)

(58) Field of Classification Search
CPC .... B65D 81/264; B65D 81/051; B65D 85/30; B65D 85/84; B65D 2581/052; B65D 2585/88

USPC ............... 206/204, 523, 524.4, 524.5, 703; 220/810, 849
See application file for complete search history.

(56) References Cited

U.S. PATENT DOCUMENTS

| | | | |
|---|---|---|---|
| 4,588,505 A | 5/1986 | Walley et al. | |
| 5,040,678 A * | 8/1991 | Lenmark, Sr. | B65D 81/107 206/443 |
| 5,160,025 A | 11/1992 | Greenawald | |
| 5,450,948 A | 9/1995 | Beausoleil et al. | |
| 5,794,773 A * | 8/1998 | Moyer | A63B 47/007 206/315.91 |
| 5,833,057 A | 11/1998 | Char et al. | |
| 5,916,470 A * | 6/1999 | Besser | B65D 81/3886 219/730 |
| 6,147,337 A * | 11/2000 | Besser | H05B 6/6494 219/730 |

(Continued)

OTHER PUBLICATIONS

United States Patent and Trademark Office, "Non-Final Office Action," issued in connection with U.S. Appl. No. 16/740,047, dated Mar. 4, 2021, 9 pages.

(Continued)

*Primary Examiner* — Luan K Bui
(74) *Attorney, Agent, or Firm* — Hanley, Flight & Zimmerman, LLC

(57) ABSTRACT

Shipping containers for batteries are described herein. An example shipping container includes a base defining a cavity, a lid to be coupled to a top of the base to substantially seal the cavity, and an absorbent pad disposed within the cavity to absorb liquid from the battery if the battery leaks.

20 Claims, 6 Drawing Sheets

(56) References Cited

U.S. PATENT DOCUMENTS

| | | |
|---|---|---|
| 7,063,212 B2 | 6/2006 | Ordonez |
| 8,820,532 B2 | 9/2014 | Shannon et al. |
| 9,072,653 B2 * | 7/2015 | Nemard .............. B65D 25/102 |
| 2001/0050237 A1 * | 12/2001 | Hacikyan ............. B65D 81/264 |
| | | 206/521 |
| 2007/0084866 A1 | 4/2007 | Saeugling |
| 2010/0047405 A1 | 2/2010 | Versteylen et al. |
| 2014/0021208 A1 * | 1/2014 | Anti ....................... F25D 3/125 |
| | | 220/592.25 |
| 2021/0214147 A1 | 7/2021 | McCully et al. |

OTHER PUBLICATIONS

United States Patent and Trademark Office, "Notice of Allowance," issued in connection with U.S. Appl. No. 16/740,047, dated Jun. 24, 2021, 6 pages.

* cited by examiner

US 11,667,458 B2

SHIPPING CONTAINERS FOR BATTERIES

RELATED APPLICATION

This patent arises from a continuation of U.S. application Ser. No. 16/740,047, titled "Shipping Containers for Batteries," filed Jan. 10, 2020, which is hereby incorporated by reference in its entirety.

FIELD OF THE DISCLOSURE

This disclosure relates generally to containers and, more particularly, to shipping containers for batteries.

BACKGROUND

Objects having hazardous materials are required to have special permitting and pay special fees for shipping and handling. For example, wet cell batteries typically contain liquid acids and/or other corrosive chemicals that can be hazardous if leaked from the battery. Therefore, current wet cell batteries are classified as hazardous material objects and cannot be shipped without providing a hazardous declaration or special permitting, as well as special packaging and handling because of the danger of potential spillage of the contents of the battery. These documents are relatively expensive and require the use of special shipping carriers that are separate from normal shipping channels.

SUMMARY

An example shipping container for a battery disclosed herein includes a base defining a cavity, a lid to be coupled to a top of the base to substantially seal the cavity, and an absorbent pad disposed within the cavity to absorb liquid from the battery if the battery leaks.

Another example shipping container for a battery disclosed herein includes a base defining a cavity, a lid to be coupled to a top of the base to substantially seal the cavity, and a plurality of foam inserts that are disposable in the cavity to change a size of the cavity for receiving the battery. One or more of the foam inserts have an absorbent pad to absorb liquid from the battery if the battery leaks.

Another example shipping container for a battery disclosed herein includes a base defining a cavity, a lid to be coupled to a top of the base to substantially seal the cavity, a base foam insert disposed in the cavity to reduce vibrations and impacts to the battery when the battery is disposed in the shipping container, and means for absorbing liquid from the battery if the battery leaks.

BRIEF DESCRIPTION OF THE DRAWINGS

FIG. 3 also shows an example battery that may be stored and/or transported in the example shipping container and an example bag in which the example battery may be disposed.

Figure 1:
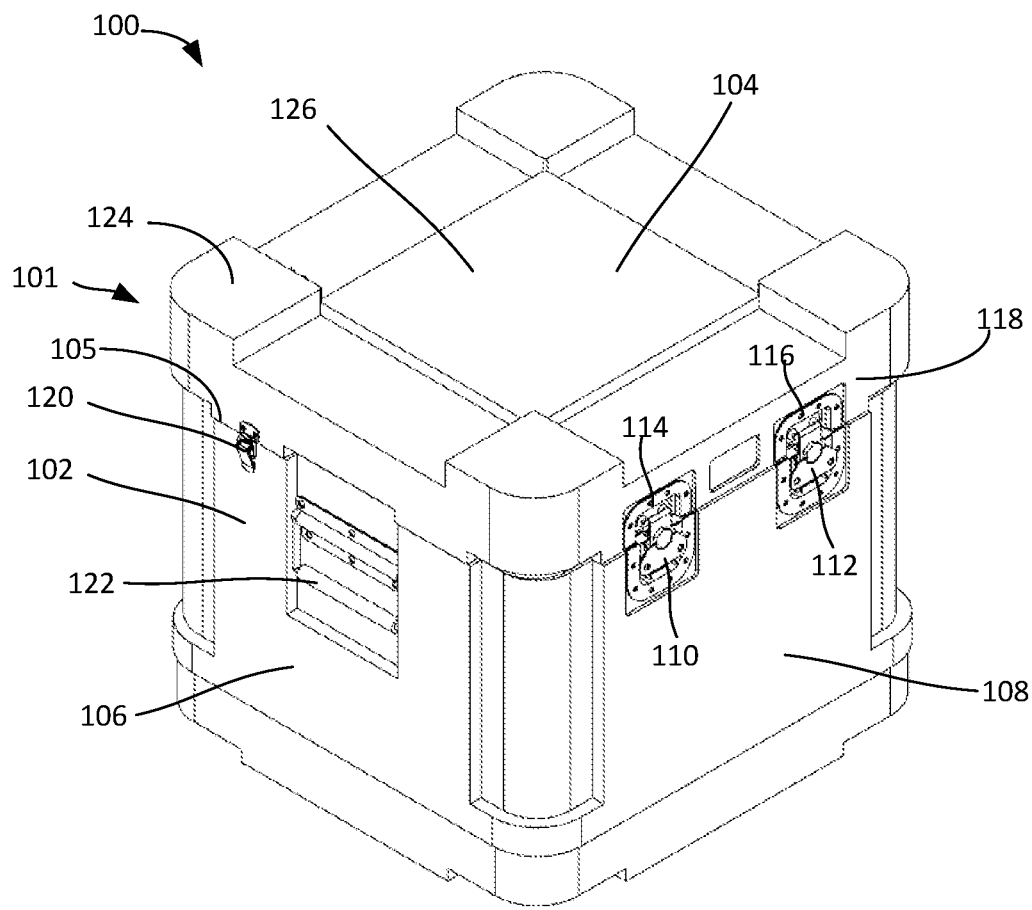
FIG. 1 is a top, left, front perspective view of an example shipping container constructed in accordance with the teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Certain materials classified as hazardous by the United Nations (UN) Testing cannot be shipped through regular shipping channels in the U.S. according to the Department of Transportation (DOT) regulations and the International Air Transport Authority (IATA) regulations. Instead, DOT and IATA regulations require hazardous materials to be prepared and shipped by a certified shipper (a certified Haz Mat shipper) and require payment of hazardous shipment fees by the shipper/carrier. Similar regulations may be encountered domestically within other counters and/or internationally between multiple countries. This problem is commonly encountered with wet cell batteries that contain liquid acids and other corrosive materials. For example, wet cell batteries such as nickel-cadmium (NiCd) are commonly used in various transportation industries (e.g., on aircraft, vehicles, such as cars, trains, etc.). These batteries have a relatively long lifespan. Therefore, it is common to ship or transport the batteries for routine service or maintenance. However, shipping these batteries requires special permitting (e.g., hazardous declarations) and handling because the batteries contain liquids, such as acids, bases, and/or other corrosive chemicals. This becomes quiet expensive for the transportation companies, battery manufacturers, and/or battery servicers.

Today, wet cell batteries are transported in corrugated cardboard boxes or polycarbonate plastic containers. However, as mentioned above, these containers are required to be shipped as hazardous materials, which requires special permitting, extra fees, and separate shipping channels. Known containers are not always properly sized for the battery and, thus, the battery may move within the container during shipping. In some instances, a battery may rupture and leak within the container. Even if the lid on the container is substantially sealed, the liquid may still eventually seep or leak from the container. Therefore, shipping hazardous materials is risky for the shippers/carriers, who can be liable for personal fines and penalties for improper preparation, marking, and/or accidents.

Disclosed herein are example shipping containers that may be used to store and/or transport hazardous material objects, such as wet cell batteries. The examples disclosed herein provide a substantially durable, leak-proof shipping container. Should an object such as a battery become damaged and/or otherwise leak within the container, the container prevents any liquid from leaking out of the container. The example shipping containers disclosed herein have passed several tests by approved testing agencies for vibration, drop, stacking and stability, and excessive heat and cold. For instance, the example shipping containers disclosed herein have passed standards of the DOT Title 49 CFR, Performance Oriented Packaging Stands, Section 178, and are certified under International Maritime Dangerous Goods (IMDG), Technical Instructions for the Safe Transport of Dangerous Goods by Air (ICAO), and International Air Transport Association (IATA) regulations and the UN Recommendations on the Transport of Dangerous Good. Therefore, with proper approval from the DOT and/or other government agencies, the example shipping containers disclosed herein would be suitable for shipping hazardous materials via non-hazardous shipping channels (e.g., regular ground and/or air shipping). This would significantly reduce the expenses, time, and liability associated with shipping these batteries and/or other hazardous materials. This would also enable aviation companies to more easily ship their batteries for proper servicing, thereby prolonging the life of the batteries.

An example shipping container disclosed herein includes a base and a lid that is hingedly coupled to the base. The base defines a cavity in which an object, such as a battery, can be disposed. The example container may include one or more latches or locks to lock the lid in a closed position, thereby substantially sealing the battery within the container. The example container includes one or more absorbent pads or liners that can be disposed within the cavity of the container. The absorbent pad(s) is/are constructed of absorbent material, such as polypropylene cloth or other materials, that is configured to readily absorb and hold liquid within the material of the absorbent pad(s) without significant deterioration (e.g., the absorbent material is solvent resistant). The absorbent pad(s) may be disposed along one or more surfaces within the cavity such as along one or more foam inserts. Should the battery become damaged and/or otherwise leak, the liquid from the battery is absorbed by the absorbent pad(s). This reduces or prevents free liquid from accumulating in the container and sloshing around, which may otherwise leak from the seal between the lid and the base.

As mentioned above, in some examples, the example shipping container includes one or more foam inserts disposed in the cavity to help support and reduce or prevent movement of the battery relative to the shell. The absorbent pad(s) may be coupled or applied along one or more surfaces of these foam inserts. The foam inserts may be coupled to the container via adhesives (e.g., glue, re-appliable adhesives, etc.). The foam inserts may be sized to pass UN Testing requirements. Examples of UN Testing standards and other regulatory and industry standards that are met by the example shipping containers are disclosed in further detail herein. If a spill occurs, the foam inserts with the pads may be discarded and new foam inserts with absorbent pads can be installed in the container. Therefore, the examples disclosed herein provide a durable, leak-proof container that can be used to store and/or transport materials and which may be suitable as a shipping container for transporting hazardous materials via traditional shipping channels.

Figure 2:
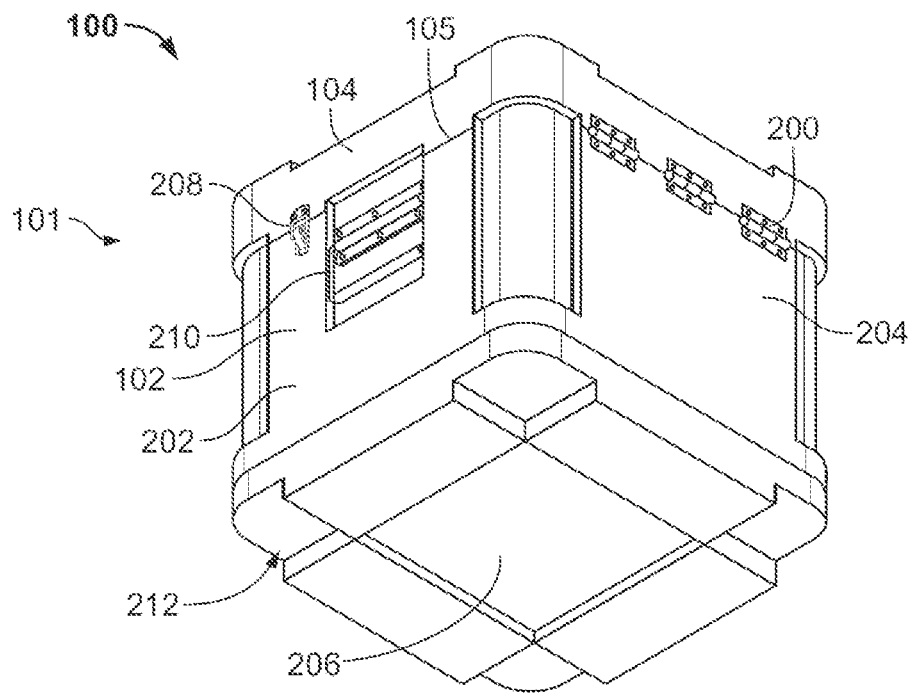
FIG. 2 is a bottom, right, rear perspective view of the example shipping container of FIG. 1.

FIGS. 1 and 2 illustrate an example shipping container 100 constructed in accordance with the teachings of this disclosure. FIG. 1 is a top, left, front perspective view of the example container 100 and FIG. 2 is a bottom, right, rear perspective view of the example container 100. The example shipping container 100 may be used to store and/or transport one or more objects, including objects having materials designated as hazardous materials by shipping and/or transportation authorities, such as wet cell batteries.

In the illustrated example, the container 100 includes a shell 101 (e.g., a case) formed by a base 102 and a lid 104. The base 102 is five sided structure that defines a cavity (shown in FIG. 3) for receiving an object (e.g., a battery). The lid 104 is to be coupled to a top 105 of the base 102 to substantially seal the cavity. In some examples, the lid 104 is movably coupled to the base 102 via one or more hinges. In particular, in this example, the lid 104 is coupled to the base 102 via three hinges 200 (one of which is referenced in FIG. 2) that allows the lid 104 to move between a closed position (as shown in FIGS. 1 and 2) and an open position (shown in FIG. 3). As shown in FIGS. 1 and 2, the base 102 has a first side wall 106 (a left wall), a second side wall 202 (a right wall) opposite the first side wall 106, a third side wall 108 (a front wall), a fourth side wall 204 (a rear wall) opposite the third side wall 108, and a bottom side wall 206. When the lid 104 is in the closed position, the lid 104 forms a top side wall that substantially seals the cavity within the base 102.

The base 102 and/or the lid 104 may be constructed of a relatively light but rigid, durable material, such as high-density polyethylene, low-density polyethylene (e.g., EXXON Mobil brand linear low-density polyethylene (LL-DPE) 8460), and/or polycarbonate plastic. In other examples, the base 102 and/or the lid 104 may be constructed of other materials. In some examples, the base 102 is a single-molded piece, and the lid 104 is a single-molded piece. In other examples, the base 102 and/or the lid 104 may be constructed of multiple parts that are coupled together.

To lock the lid 104 in the closed position, the container 100 may include one or more latches. For example, as shown in FIG. 1, the container 100 includes a first latch 110 and a second latch 112 on the third side wall 108. In this example, the first and second latches 110, 112 are twist actuated draw latches (sometimes referred to as butterfly latches). The first and second latches 110, 112 mate with corresponding strikes 114, 116 (also referred to as catches or keepers) on a front edge 118 of the lid 104. In other examples, other types of latches may be used, such as a slide-release buckle and/or a metal over-center draw latch. In other examples, the first and/or second latches 110, 112 may be in different locations (e.g., one latch on the first side wall 106 and another latch on the second side wall 202). In some examples, one or more additional latches or fasteners may be used to help lock and seal the lid 104 in the closed position. For example, the container 100 includes a first fastener 120 on the first side wall 106 and a second fastener 208 on the second side wall 202. The first and second fasteners 120, 208 help lock and seal the lid 104 against the base 102. In other examples, the container 100 may include more or fewer fasteners and/or the fastener(s) may be disposed in other locations.

While in this example the lid 104 is hingedly coupled to the base 102, in other examples the lid 104 may be completely removable from the base 102. In such an example, one or more latches may be located on the fourth side wall 204 of the base 102. In still other examples, the lid 104 may be movably coupled to or completely removable from the base 102 in other manners.

As shown in FIGS. 1 and 2, the container 100 has a first handle 122 coupled to the first side wall 106 and a second handle 210 coupled to the second side wall 202. The first and second handles 122, 210 may be used for carrying the container 100. The first and second handles 122, 210 are pivotably coupled to the respective side walls 106, 202. In some examples, the first and second handles 122, 210 may be spring loaded handles. The first and second handles 122, 210 may be disposed in recesses formed in the respective side walls 106, 202. In other examples, the container 100 may have more or fewer handles. In some examples, the container 100 does not have any handles.

In some examples, the base 102 and/or the lid 104 provide features to enable multiple containers to be stacked vertically. For example, as shown in FIGS. 1 and 2, the lid 104 has raised corner portions 124 (one of which is referenced in FIG. 1) and the bottom side wall 206 of the base 102 has corner recesses 212 (one of which is referenced in FIG. 2) that are complementary to the raised corner portions 124. When multiple containers are vertically stacked, the raised corner portions 124 of one container fits within the corner recesses 212 of another container. This mating helps prevent the containers from falling.

In the illustrated example, the lid 104 has a planar section 126. In some examples, shipping instructions or other indicia may be printed on, engraved in, and/or coupled to the planar section 126. For example, if the container 100 is approved by the DOT and/or other agencies for shipping through non-hazardous shipping channels, a specialized shipping permit may be disposed on the planar section 126. Additionally or alternatively, instructions for properly installing one or more foam inserts (disclosed in further detail here) and sealing the container 100 may be provided on the planar section 126. In other examples, such instructions and/or indicia may be provided on other side surfaces of the container 100.

Figure 3:
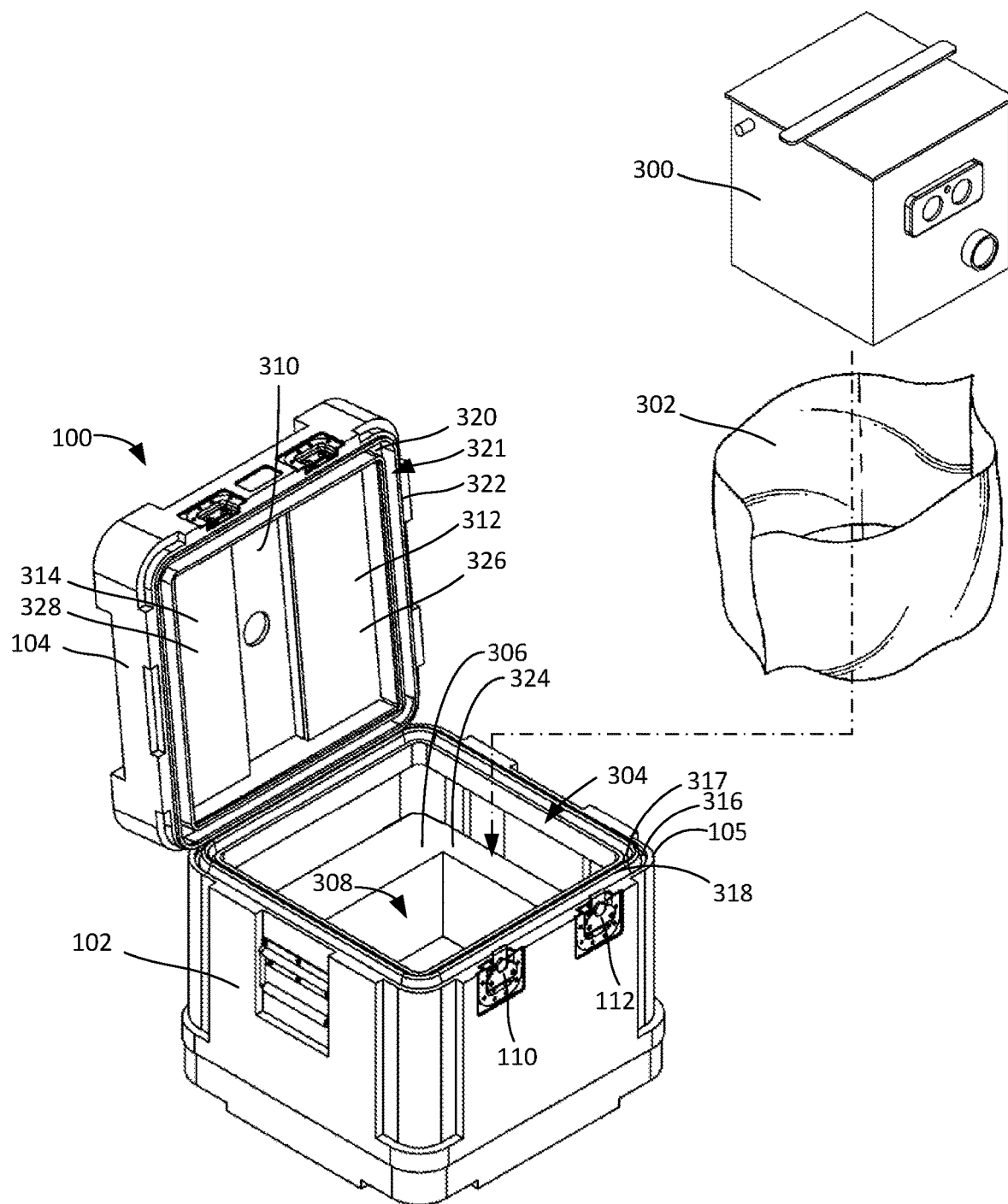
FIG. 3 is a perspective view of the example shipping container of FIG. 1 with an example lid in an open position.

FIG. 3 shows the container 100 with the lid 104 in the open position. The lid 104 has been rotated about the hinges 200 (FIG. 2). Also shown in FIG. 3 is an example wet cell battery 300 that may be stored and/or transported in the container 100. The battery 300 may be an aircraft battery, such as a NiCd battery, that contains liquid acids, bases, and/or other corrosive chemicals. In this example, the battery 300 is generally cube shaped. However, in other examples, the battery 300 may have different shapes and/or sizes. FIG. 3 also shows an example bag 302. In some examples, the battery 300 is be placed in the bag 302 and the bag 302 is sealed before placing the battery 300 in the container 100. The bag 302 helps to contain any leakage of liquid from the battery 300. In other examples, a bag is not used.

As shown in FIG. 3, the base 102 defines a cavity 304 in which the battery 300 is to be disposed. In the illustrated example, the container 100 includes a base foam insert 306 disposed in the cavity 304. The base foam insert 306 reduces vibrations and impacts on the battery 300 while storing and transporting the battery 300 in the container 100. In some examples, the base foam insert 306 is constructed of a high-density, closed cell, polyethylene or polystyrene foam. In other examples, the base foam insert 306 may be constructed of other foam materials. In some examples, the base foam insert 306 is coupled to an inner surface of the base 102 via an adhesive, such as glue or a re-appliable/reusable adhesive. In other examples, the base foam insert 306 may be coupled to the base 102 via other techniques (e.g., hook and loop fasteners). Additionally or alternatively, the base foam insert 306 may be held in the base 102 via friction fit. The base foam insert 306 may substantially fill the bottom of the cavity 304. In the illustrated example, the base foam insert 306 does not extend up to a top of the base 102. In other examples, the base foam insert 306 may be sized taller or shorter. In some examples, the base foam insert 306 is sized to meet minimum requirements for passing UN Testing.

Figure 4:
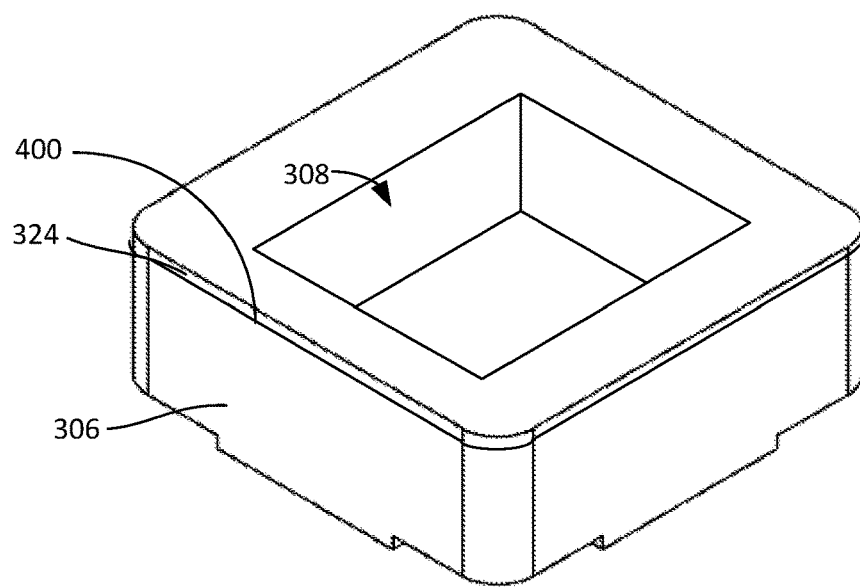
FIG. 4 is a perspective view of an example base foam insert that may be utilized in the example shipping container of FIG. 1.

In the illustrated example, the base foam insert 306 has a recess 308 to receive the battery 300. The recess 308 may be dimensioned to receive the bottom of the battery 300 snugly (e.g., the inner dimensions of the recess may be slightly less than the outer dimensions of the battery 300). As such, when the battery 300 is disposed in the recess 308, the battery 300 causes the base foam insert 306 to compress, which induces a holding friction on the battery 300. FIG. 4 shows an isolated view of the base foam insert 306.

Once the battery 300 is inserted into the base 102, the lid 104 may be closed and locked via the first and second latches 110, 112. In some examples, one or more foam inserts are disposed on a bottom side 310 of the lid 104. For example, as shown in FIG. 3, the container 100 includes a first lid foam insert 312 and a second lid foam insert 314 that are disposed on the bottom side 310 of the lid 104. The first and second lid foam inserts 312, 314 may be constructed of the same material as the base foam insert 306 or a different foam material. In some examples, the first and second lid foam inserts 312, 314 are coupled to the bottom side 310 of the lid 104 via an adhesive, such as glue. In some examples, when the battery 300 is disposed in the recess 308 and the lid 104 is closed, the first and second lid foam inserts 312, 314 may contact a top of the battery 300 and compress. This reduces or prevents vertical movement of the battery 300 in the container 100. In some examples, the thickness of the first and second lid foam inserts 312, 314 corresponds to the minimum thickness to accommodate a largest sized battery for which the container 100 can pass UN Testing. Additional foam inserts may be used to fill excess space when smaller batteries are shipped. In this example, the second lid foam insert 314 is spaced from the first lid foam insert 312. In some examples, the first and second lid foam inserts 312, 314 are space apart to accommodate a bracket or other structure on the top of the battery 300. In other examples, the first and second lid foam inserts 312, 314 may be in contact with each other. In some examples only one lid foam insert is utilized, and such a single lid foam insert may cover the entire bottom side 310 of the lid 104. In other examples, multiple lid foam inserts are utilized. The lid foam inserts may be stacked and/or arranged in various configurations.

In some examples, the container 100 includes one or more seals between a top rim of the base and a bottom rim of the lid. For example, as shown in FIG. 3, the container 100 includes a first seal 316 (e.g., a rubber seal, a sealing gasket) and a second seal 317 around a top rim 318 of the base 102 and a third seal 320 disposed in a groove 321 formed in a bottom rim 322 of the lid 104. When the lid 104 is attached to the top 105 of the base 102, the first and second seals 316, 317 engage the bottom rim 322 of the lid 104 and the third seal 320 engages the top rim 318 of the base 102, thereby forming a sealing interface to substantially seal the cavity 304 and prevent liquid from leaking out of the container 100 between the base 102 and the lid 104. Example seals that may be implemented as the first, second, and third seals 316, 317, 320 are disclosed in U.S. Pat. No. 7,063,212, titled "Multiple Seal Storage and Transport Container," filed Sep. 19, 2002, which is hereby incorporated by reference in its entirety. In other examples, other seal configurations may be used (e.g., one seal on the bottom rim 322 of the lid 104 and one seal on the top rim 318 of the base 102, only one seal on the bottom rim 322 of the lid 104, only one seal on the top rim 318 of the base 102, etc.).

The example container 100 includes one or more pads or liners of absorbent material disposed in the cavity 304 to absorb any liquid leaked from the battery 300. In particular, many batteries contain liquid acids, bases, and other corrosive chemicals. Should the battery 300 become damaged, the liquid could leak from the battery 300. Loose liquid in the container 100 could eventually seep or leak out from between the seals 316, 317, 320. In particular, while the bag 302 and/or the seals 316, 317, 320 may be able to contain small amounts of liquid in the container 100, the bag 302 and/or the seals 316, 317, 320 may not be able to effectively contain larger leaks that result in large volumes of liquid. Therefore, the absorbent pad(s) absorb(s) the liquid and therefore reduce or prevent free liquid from accumulating and sloshing around the inside of the container 100.

In the illustrated example, a top of the base foam insert 306 is lined with an example absorbent pad 324. The absorbent pad 324 is also shown in FIG. 4. Referring to FIG. 4, the absorbent pad 324 covers a top surface 400 of the base foam insert 306 and surfaces of the base foam insert defining the recess 308. In some examples, the absorbent pad 324 is flexible and can conform to the shape of the underlying object. In some examples, the absorbent pad 324 is constructed of polypropylene cloth. In other examples, the absorbent pad 324 may be constructed of another type of absorbent material (e.g., silica gel packs, desiccant). In some examples, the absorbent pad 324 is coupled to the base foam insert 306 via an adhesive, such as glue (e.g., CC-4144A clear adhesive), a re-appliable adhesive, and/or double-sided tape. In other examples, the absorbent pad 324 may be coupled to the base foam insert 306 via other manners (e.g., hook and loop fasteners). Should the liquid in the battery 300 leak, the liquid is absorbed by the absorbent pad 324, which prevents free liquid from accumulating and sloshing around the inside of the container 100. While in this example the absorbent pad 324 only covers a top of the base foam insert 306, in other examples, one or more absorbent pads may be provided one or more other surfaces (e.g., the side surfaces, the bottom surface, etc.) of the base foam insert 306.

In addition to or as an alternative to the absorbent pad 324 on the base foam insert 306, one or more absorbent pad may be provided in other locations within the cavity 304. For example, first and second absorbent pads 326, 328 are coupled to the respective first and second lid foam inserts 312, 314. The first and second absorbent pads 326, 328 may be constructed of the same material as the absorbent pad 324 or a different material. The first and second absorbent pads 326, 328 function the same as the absorbent pad 324 to absorb any liquid that potentially comes into contact with the first and/or second lid foam inserts 312, 314. Therefore, in this example, a portion of all six sides of the battery 300 are covered with absorbent pads. As such, if a leak occurs, the absorbent pads 324, 326, 328 can effectively absorb the liquid and prevent free liquid from accumulating in the container 100. In addition to or as an alternative to the absorbent pads 324, 326, 328, one or more other absorbent pads may be provided along other surfaces of the cavity 304. For example, one or more absorbent pads may be disposed along one or more of the inner surfaces of the side walls of the base 102.

Figure 5:
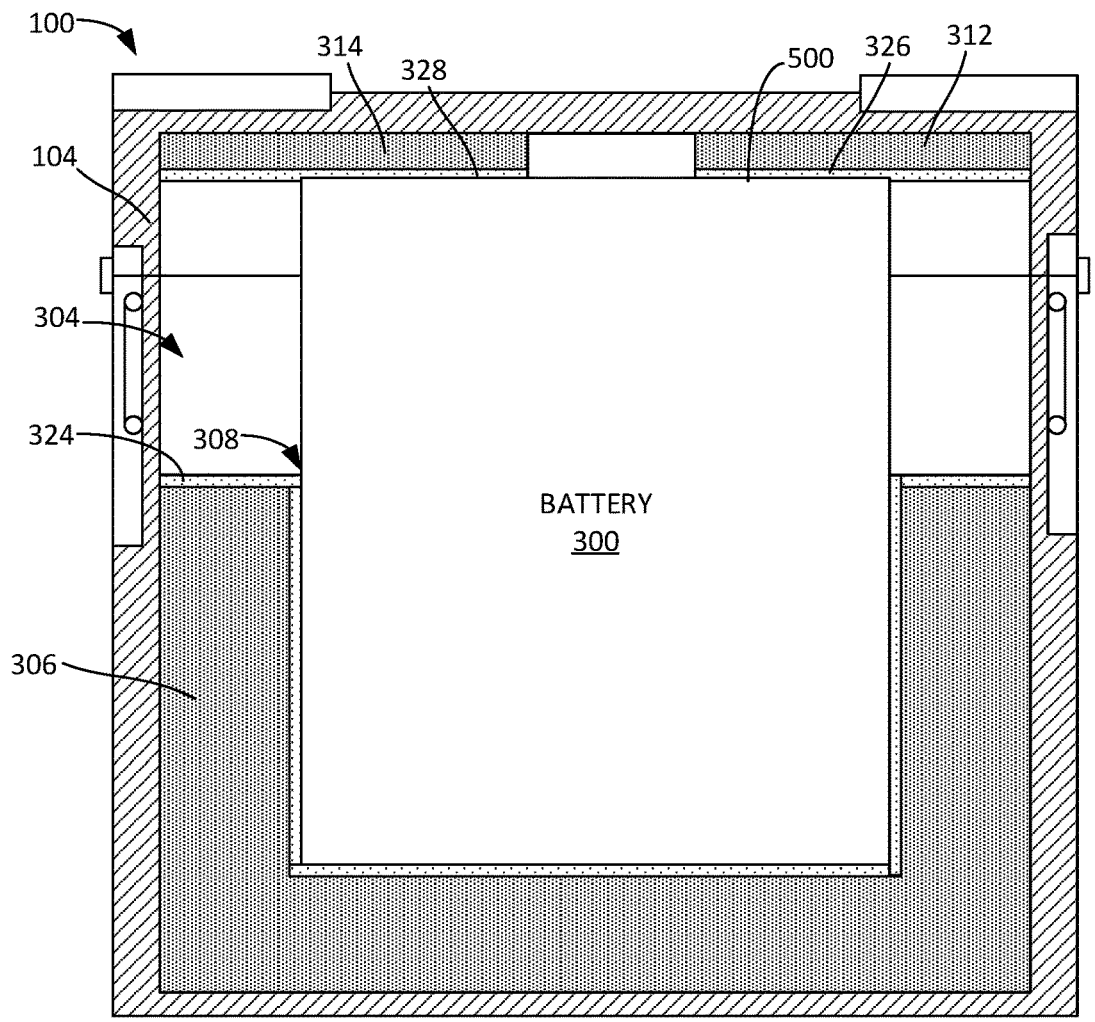
FIG. 5 is a cross-sectional view showing the example battery of FIG. 3 within the example shipping container with the example lid in the closed position.

FIG. 5 is a cross-sectional view of the battery 300 in the container 100. The bag 302 is not shown in FIG. 5. However, if the bag 302 is used, it is understood that the bag 302 would be disposed around the battery 300, between the battery 300 and the foam inserts 306, 312, 314.

As shown in FIG. 5, the battery 300 is disposed in the recess 308 of the base foam insert 306. The recess 308 (considering the thickness of the absorbent pad 324) is sized to snuggly receive the battery 300. When the battery 300 is disposed in the recess 308, the battery 300 may slightly compress the absorbent pad 324 and/or the base foam insert 306. The base foam insert 306 prevents or reduces side-to-side movement of the battery 300 relative to the container 100 as well as, in some examples, up-and-down movement of the battery 300 in the container 100. A top 500 of the battery 300 is engaged with the first and second absorbent pads 326, 328. The first and second foam lid inserts 312, 314 and the absorbent pads 326, 328 are sized such that when the lid 104 is closed and locked, the top 500 of the battery 300 contacts the absorbent pads 326, 328 and causes a compression of the absorbent pads 326, 328 and/or the first and second lid foam inserts 312, 314. This reduces or prevents up-and-down movement of the battery 300 relative to the container 100. Therefore, the battery 300 is held securely in the container 100.

Should the battery 300 become damaged and/or otherwise leak, the liquid from the battery 300 is absorbed by the absorbent pads 324, 326, 328. When the container 100 reaches its desired destination, a person can discard the foam inserts 306, 312, 314 and install new foam inserts (with new absorbent pads) into the cavity 304 before shipping another battery. In other examples, just the absorbent pads can be removed and replaced with new absorbent pads. Thus, the container 100 is reusable and therefore environmentally friendly.

In some examples, the amount of absorbent pad material used in the container 100 is sufficient to completely absorb the entire liquid contents of the battery 300. As such, if there is a full rupture and leakage of the battery 300, all of the liquid is absorbed by the absorbent pads. This ensures that no liquid can leak from the container 100, which renders the example container 100 suitable for traditional (non-hazardous) shipping channels (if permitted by the DOT). While the absorbent pads are designed to absorb liquid, the foam inserts (e.g., the base foam insert 306, the first and second lid foam inserts 312, 314, the top foam insert 600, etc.) are constructed of material that is not designed to absorb liquid. As such, if there is liquid in the container 100, the liquid does not compromise the structural integrity of the foam inserts. In this manner, the foam inserts can continue to function to support and cushion movement of the battery 300 in the container 100.

The example shipping container 100 has been passed a number of regulatory and industry standards as listed in Tables 1 and 2 below. The example shipping container 100 may also meet other regulatory and industry standards not listed below.

TABLE 1

Regulatory References Passed

| Test | 49 CFR[1] October 2018 Edition | UN[2] 20th Edition | UNDG[3] 2018 Edition | ICAO[4] 2019-2020 Edition | IATA[5] 60th Edition |
|---|---|---|---|---|---|
| Drop: | 178.603 | 6.1.5.3 | 6.1.5.3 | 6; 4.3 | 6.3.3 |
| Stacking: | 178.606 | 6.1.5.6 | 6.1.5.6 | 6; 4.6 | 6.3.6 |
| Vibration: | 178.608 | — | — | 4; 1.1.1 & 4; 1.1.4 | 5.0.2.7 |

[1]United States Department of Transportation Code of Federal Regulations (CFR) Title 49, Transportation, Parts 100-185
[2]The United Nations Recommendations on the Transport of Dangerous Goods - Model Regulations (UN - Orange Book)
[3]International Maritime Dangerous Goods Code (IMDG)
[4]Technical Instructions for the Safe Transport of Dangerous Goods by Air (ICAO)
[5]International Air Transport Association (IATA) Dangerous Goods Regulations

TABLE 2

Industry Standards Passed

| | | |
|---|---|---|
| Drop: | ASTM[6] D5276: | Standard Test Method for Drop Test of Loaded Containers by Free Fall |
| | ASTM[6] D7790: | Standard Test Method for the Preparation of Plastic Packagings Containing Liquids for United Nations (UN) Drop Testing |
| | ISO[7] 2248: | Packaging - Complete, Filled Transport Packages - Vertical Impact Test by Dropping |
| Stacking: | ASTM[6] D4577: | Standard Test Method for Compression Resistance of a Container Under Constant Load |
| | ISO[7] 2234: | Packaging - Complete, Filled Transport Packages - Stacking Test using Static Load |
| Vibration: | ASTM[6] D999: | Standard Test Method of Vibration Testing of Shipping Containers |
| | ISO[7] 2247 | Packaging - Complete, Filled Transport Packages - Vibration Test at Fixed Low Frequency |

[6]American Society for Testing and Materials (ASTM)
[7]International Organization for Standardization (ISO)

Figure 6A:
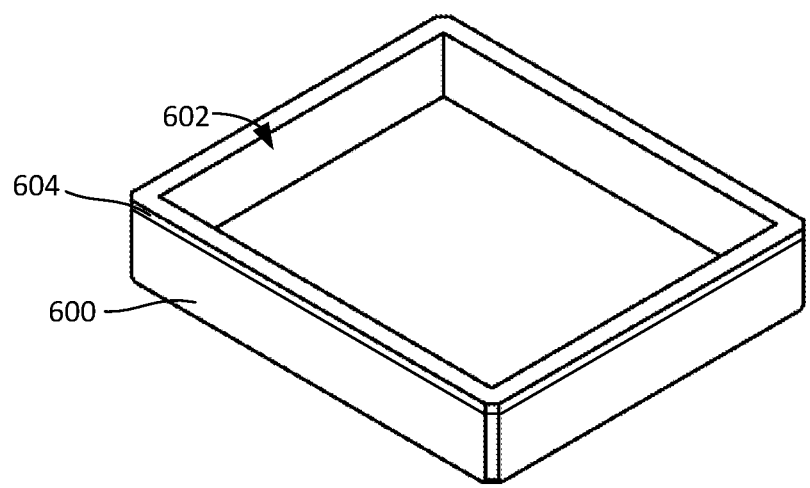
FIGS. 6A and 6B are a top and bottom perspective views, respectively, of an example top foam insert that may be used with the example shipping container of FIG. 1.
Figure 6B:
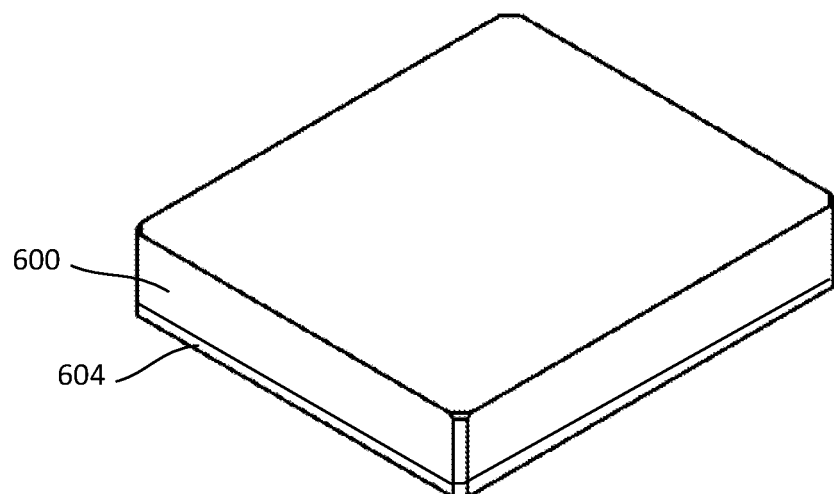

In some examples, the container 100 can include a top foam insert that may be used to fill excess space between the top 500 of the battery 300 and the lid 104 if a smaller sized battery is used. FIGS. 6A and 6B are top and bottom perspective views of an example top foam insert 600. The top foam insert 600 has a recess 602. Before closing the lid 104 of the container 100, the top foam insert 600 may be placed over the top 500 of the battery 300 such that the top 500 of the battery 300 is disposed in the recess 602. When the lid 104 is closed, the top foam insert 600 fills excess space between the top 500 of the battery 300 and the first and second lid foam inserts 312, 314, which helps reduce or prevent movement of the battery 300 relative to the container 100. The top foam insert 600 can be constructed of the same foam material as the base foam insert 306 or may be constructed of another foam material. In the illustrated example, an absorbent pad 604 (e.g., polypropylene cloth) is coupled to the top foam insert 600. The absorbent pad 604 further helps to absorb liquid that may leak from the battery 300. The top foam insert 600 provides additional surface area for an absorbent pad, thereby increasing the total absorbent pad area in the cavity 304.

Figure 7:
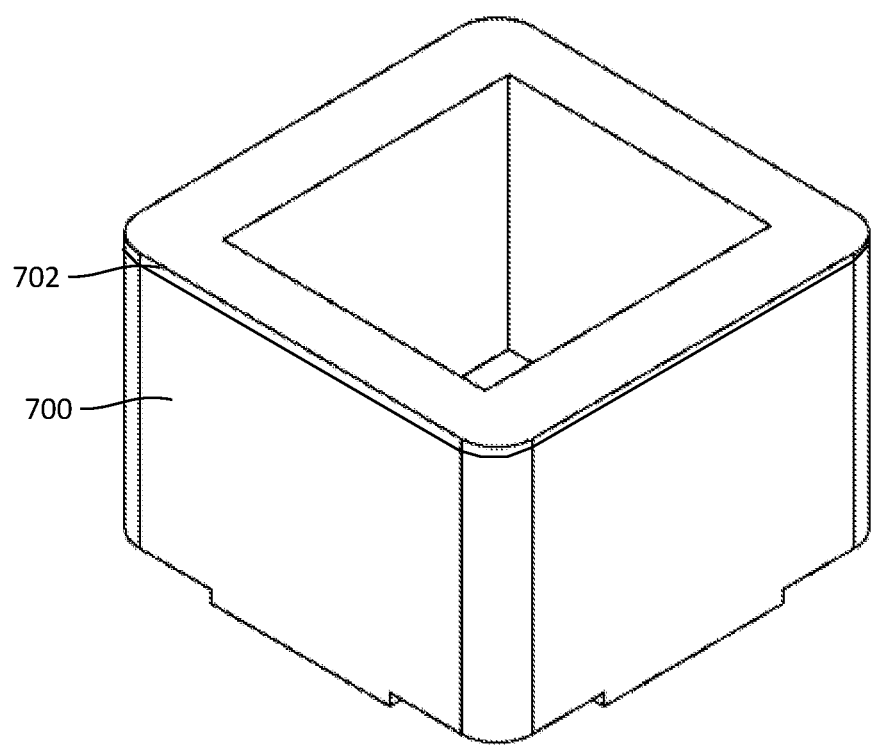
FIGS. 7 and 8 are example base foam inserts that may be used with the example shipping container of FIG. 1.
Figure 8:
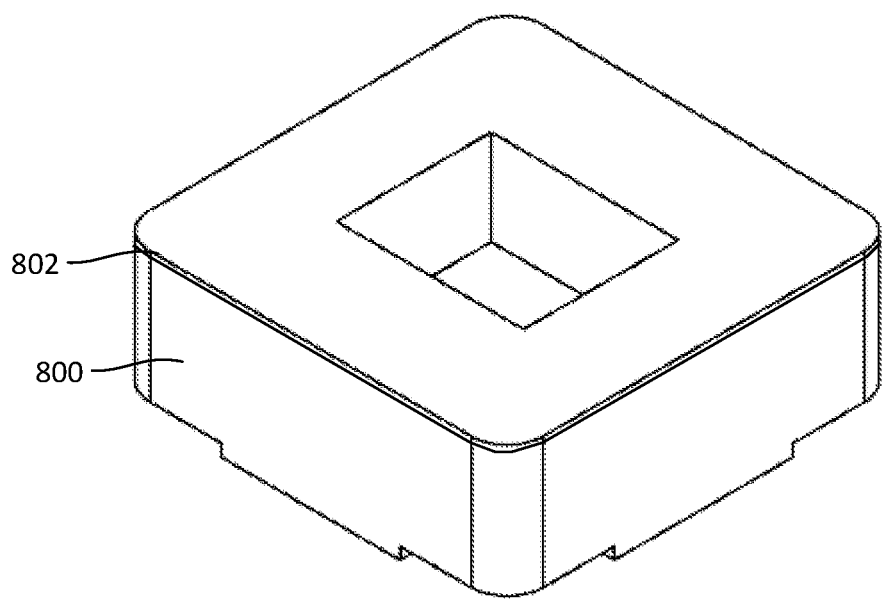

Different sized base foam inserts may be used in the container 100 depending on the size of the battery 300. FIGS. 7 and 8 illustrate other example base foam inserts 700, 800 that may be used in the container 100 in place of the base foam insert 306. The base foam insert 700 of FIG. 7 has a larger recess with higher walls, whereas the base foam insert 800 of FIG. 8 has a shallower recess with lower walls. The base foam inserts 700, 800 have absorbent pads 702, 802, respectively, that are similar to the base foam insert 306 and used to absorb liquids from a battery.

Figure 9:
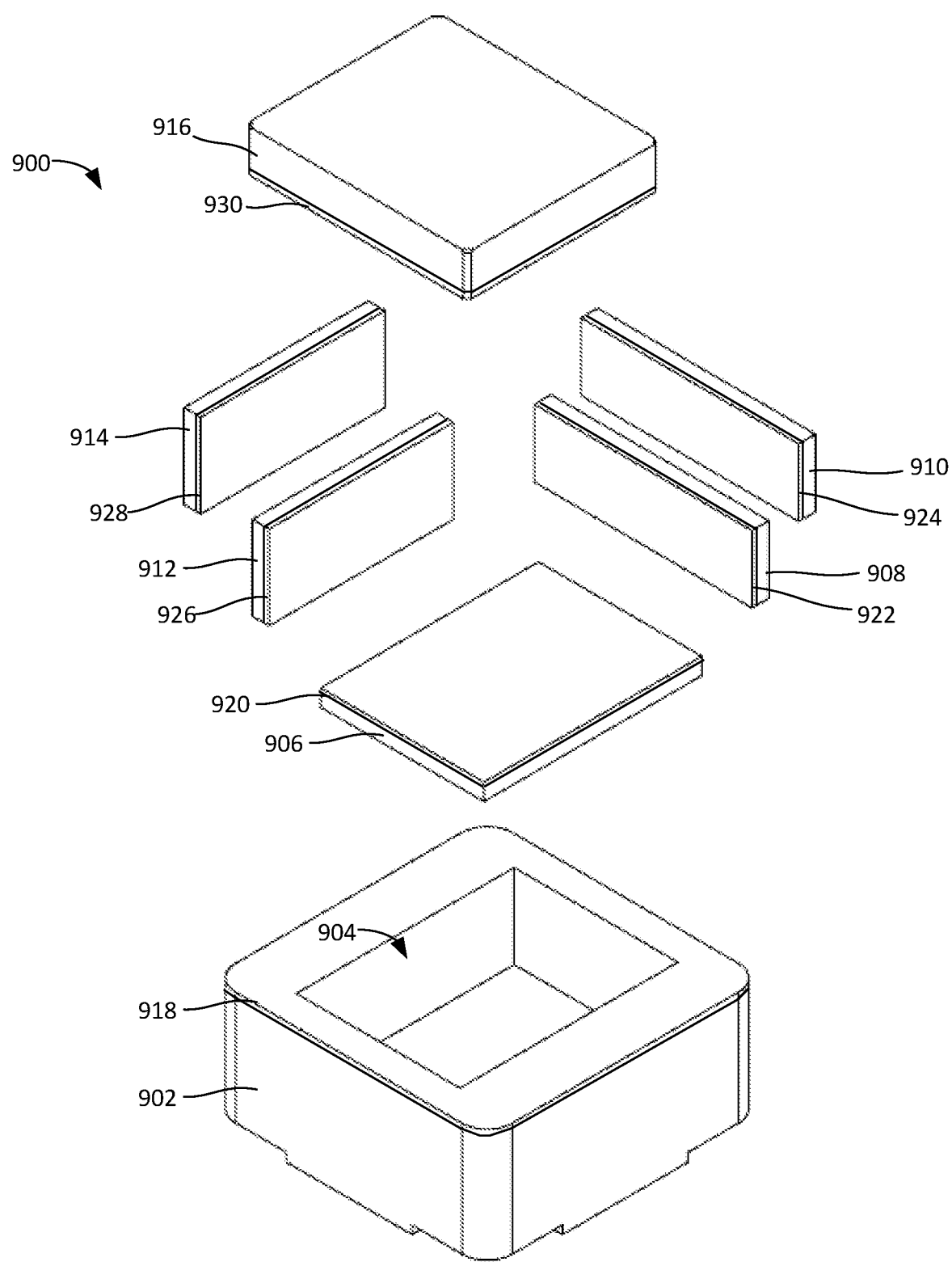
FIG. 9 shows an example multi-piece foam insert kit that may be used with the example shipping container of FIG. 1.

FIG. 9 illustrates an example multi-piece foam insert kit 900 that can be used with the container 100. The kit 900 includes a plurality of foam inserts that are disposable in the cavity 304 to change the size of the cavity 304 for receiving a battery. The foam inserts can be arranged or configured to accommodate various sized batteries, thereby creating a universal container. As such, a user can arrange one or more inserts of the kit 900 within the base 102 to accommodate a desired battery size.

In the illustrated example, the kit 900 includes a base foam insert 902 having a recess 904. The base foam insert 902 can be disposed in the cavity 304 of the container 100, similar to the base foam insert 306. In some examples, the recess 904 is sized to accommodate a largest size battery. The kit 900 also includes various sized foam inserts 906, 908, 910, 912, 914, 916. One or more of the foam inserts 906-916 can be placed along the sides, top, and/or bottom of the battery to ensure the battery is snuggly fit within the container 100. In some examples, the foam inserts 902, 906-916 are constructed of a high-density, closed cell, polyethylene or polystyrene foam. In other examples, the foam inserts 902, 906-916 may be constructed of other foam materials. One or more of the foam inserts 906-916 can be stacked. The foam inserts 906-916 can be attached to each other and/or the walls of the base 102 by pressure fit by size, adhesives (e.g., glue), and/or any other fastening means. In some examples, one or more of the foam inserts 902, 906-916 has an absorbent pad for absorbing liquid. For example, each of the foam inserts 902, 906-916 of FIG. 9 has a respective absorbent pad 918, 920, 922, 924, 926, 928, 930 along at least one surface of the respective foam insert. The absorbent pads 918-930 may be coupled the respective foam inserts via an adhesive, such as glue (e.g., CC-4144A clear adhesive), a re-appliable adhesive, and/or double-sided tape. As such, if a battery leaks within the container 100, the absorbent pads 918-930 absorb the liquid. In some examples, more than one side or surface of each of the foam inserts 902, 906-916 is lined with an absorbent pad. The kit 900 may include any number of foam inserts, and the foam inserts may be any shape and/or size. Multiple ones of the same size/shape insert may be provided, as long as the sizes meet minimum requirements for passing UN Testing. Therefore, instead of needing different sized base foam inserts and lid foam inserts for each size battery, a single universal foam insert kit can be provided with each container shell. Then, a user can configure the foam inserts according to the size of the battery to be shipped.

While many of the example shipping containers disclosed here are described in connection with storing or transporting batteries, it is understood that the example shipping containers disclosed herein can be used to store and/or transport any other object, hazardous or non-hazardous.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example shipping containers have been disclosed that are durable and leak-proof and, thus, are suitable for storing and/or transporting objects designated as being or having hazardous materials, such as wet cell batteries. The example shipping containers include one or more absorbent pads that can absorb liquid within the container to substantially reduce or prevent free liquid from accumulating in the example container. If authorized by the DOT, the example shipping containers disclosed herein may be suitable for shipping hazardous materials via non-hazardous shipping channels (e.g., regular ground and/or air shipping). This would significantly reduce the expenses, time, and liability associated with shipping these batteries and/other hazardous materials.

Example methods, apparatus, and articles of manufacture for storing or transporting objects, such as batteries, are disclosed herein. Different aspects of the examples disclosed herein can be combined in other examples. Further examples and combinations thereof include the following clauses.

Clause 1 is a shipping container for a battery. The shipping container includes a base defining a cavity, a lid to be coupled to a top of the base to substantially seal the cavity, and an absorbent pad disposed within the cavity to absorb liquid from the battery if the battery leaks.

Clause 2 includes the shipping container of Clause 1, wherein the absorbent pad is constructed of polypropylene cloth.

Clause 3 includes the shipping container of Clauses 1 or 2, further including a base foam insert disposed in the cavity. The base foam insert has a recess to receive the battery. The absorbent pad is coupled to the base foam insert.

Clause 4 includes the shipping container of Clause 3, wherein the absorbent pad covers a top surface of the base foam insert and surfaces of the base foam insert defining the recess.

Clause 5 includes the shipping container of Clauses 3 or 4, wherein the absorbent pad is coupled to the base foam insert via an adhesive.

Clause 6 includes the shipping container of any of Clauses 3-5, wherein the base foam insert is constructed of high-density polyethylene.

Clause 7 includes the shipping container of any of Clauses 3-6, further including a first lid foam insert disposed on a bottom side of the lid.

Clause 8 includes the shipping container of Clause 7, wherein the absorbent pad is a first absorbent pad, further including a second absorbent pad coupled to the first lid foam insert.

Clause 9 includes the shipping container of Clause 8, further including a second lid foam insert disposed on the bottom side of the lid. The second lid foam insert is spaced from the first lid foam insert.

Clause 10 includes the shipping container of Clause 9, further including a third absorbent pad coupled to the second lid foam insert.

Clause 11 includes the shipping container of Clause 10, further including a top foam insert to be disposed between a top of the battery and the first and second lid foam inserts.

Clause 12 includes the shipping container of Clause 11, further including a fourth absorbent pad coupled to the top foam insert.

Clause 13 includes the shipping container of any of Clauses 1-12, wherein the lid is movably coupled to the base via one or more hinges, further including: one or more latches to lock the lid in a closed position, one or more seals between a top rim of the base and a bottom rim of the lid, and one or more handles coupled to the base.

Clause 14 is a shipping container for a battery. The shipping container includes a base defining a cavity, a lid to be coupled to a top of the base to substantially seal the cavity, and a plurality of foam inserts disposable in the cavity to change a size of the cavity for receiving the battery. One or more of the foam inserts has an absorbent pad to absorb liquid from the battery if the battery leaks.

Clause 15 includes the shipping container of Clause 14, wherein the absorbent pad is constructed of polypropylene cloth.

Clause 16 includes the shipping container of Clauses 14 or 15, wherein one of the plurality of foam inserts includes a base foam insert to be disposed in the cavity. The base foam insert has a recess to receive the battery.

Clause 17 includes the shipping container of any of Clauses 14-16, wherein the plurality of foam inserts are constructed of high-density polyethylene.

Clause 18 is a shipping container for a battery. The shipping container includes a base defining a cavity, a lid to be coupled to a top of the base to substantially seal the cavity, a base foam insert disposed in the cavity to reduce vibrations and impacts to the battery when the battery is disposed in the shipping container, and means for absorbing liquid from the battery if the battery leaks.

Clause 19 includes the shipping container of Clause 18, wherein the absorbing means is coupled to the base foam insert.

Clause 20 includes the shipping container of Clauses 18 or 19, wherein the absorbing means is a first absorbing means, further including: a lid foam insert disposed on a bottom side of the lid, and second means for absorbing the liquid, the second absorbing means coupled to the lid foam insert.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A shipping container for a battery, the shipping container comprising:
    a base defining a cavity;
    a lid to be coupled to a top of the base to seal the cavity;
    a base foam insert disposed in the cavity, the base foam insert having a recess extending into a top surface of the base foam insert, the recess to receive the battery;
    an absorbent pad coupled to the base foam insert via an adhesive, the absorbent pad disposed along and covering the top surface of the base foam insert and surfaces of the base foam insert defining the recess, the absorbent pad to absorb liquid from the battery if the battery leaks;
    a first lid foam insert coupled to a bottom side of the lid, the first lid foam insert to contact a top of the battery when the battery is disposed in the recess and the lid is coupled to the top of the base; and
    a second lid foam insert disposed on the bottom side of the lid, the second lid foam insert spaced from the first lid foam insert to accommodate a bracket on the top of the battery.

2. The shipping container of claim 1, wherein the absorbent pad is constructed of polypropylene cloth.

3. The shipping container of claim 1, wherein the base foam insert is constructed of high-density polyethylene.

4. The shipping container of claim 1, wherein the base foam insert is coupled to an inner surface of the base via an adhesive.

5. The shipping container of claim 1, wherein the base foam insert is held in the base via friction.

6. The shipping container of claim 1, wherein the lid is movably coupled to the base via one or more hinges, further including:
    one or more latches to lock the lid to the top of the base;
    one or more seals between a top rim of the base and a bottom rim of the lid; and
    one or more handles coupled to the base.

7. The shipping container of claim 1, wherein the absorbent pad is a first absorbent pad, the shipping container further including a second absorbent pad coupled to the first lid foam insert and a third absorbent pad coupled to the second lid foam insert.

8. The shipping container of claim 7, wherein, when the lid is coupled to the top of the base, the second and third absorbent pads are spaced apart from the first absorbent pad.

9. The shipping container of claim 1, further including a bag to cover the battery, such that when the battery is disposed in the recess of the base foam insert, the bag is between the battery and the absorbent pad.

10. A shipping container for a battery, the shipping container comprising:
    a base defining a cavity;
    a lid to be coupled to a top of the base to seal the cavity;
    a base foam insert disposed in the cavity, the base foam insert having a recess extending into a top surface of the base foam insert, the recess to receive the battery;
    a first lid foam insert disposed on a bottom side of the lid;
    an absorbent pad coupled to the first lid foam insert, the absorbent pad to absorb liquid from the battery if the battery leaks; and
    a second lid foam insert disposed on the bottom side of the lid.

11. The shipping container of claim 10, wherein the first lid foam insert is spaced from the base foam insert when the lid is in a closed position.

12. The shipping container of claim 10, wherein the absorbent pad is constructed of polypropylene cloth.

13. The shipping container of claim 10, wherein the first lid foam insert is constructed of high-density polyethylene.

14. The shipping container of claim 10, wherein the first lid foam insert is coupled to the bottom side of the lid via an adhesive.

15. The shipping container of claim 10, wherein the absorbent pad is a first absorbent pad, the shipping container further including a second absorbent pad coupled to the second lid foam insert.

16. The shipping container of claim 10, the second lid foam insert spaced from the first lid foam insert to accommodate a bracket on a top of the battery.

17. A shipping container for a battery, the shipping container comprising:
    a base defining a cavity;
    a lid to be coupled to a top of the base to seal the cavity;
    a base foam insert disposed in the cavity, the base foam insert having a recess extending into a top surface of the base foam insert, the recess to receive the battery;
    a lid foam insert coupled to a bottom side of the lid;
    a top foam insert to be disposed between a top of the battery and the lid foam insert when the battery is disposed in the recess and the lid is closed; and
    an absorbent pad coupled to the top foam insert.

18. The shipping container of claim 17, wherein the recess is a first recess, the top foam insert having a second recess to receive the battery when the battery is disposed in the first recess and the lid is closed.

19. The shipping container of claim 18, wherein the absorbent pad is disposed along inner surfaces of the top foam insert defining the second recess.

20. The shipping container of claim 17, wherein the absorbent pad is constructed of cloth.

* * * * *